US012649393B2

(12) United States Patent
Petit et al.

(10) Patent No.: US 12,649,393 B2
(45) Date of Patent: Jun. 9, 2026

(54) VEHICLE SEAT SLIDE

(71) Applicant: FAURECIA Sièges d'Automobile, Nanterre (FR)

(72) Inventors: Fabrice Petit, Saint Georges des Groseillers (FR); Guillaume Petot, La Ferrière Aux Etangs (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 120 days.

(21) Appl. No.: 18/709,252

(22) PCT Filed: Nov. 15, 2022

(86) PCT No.: PCT/EP2022/081977
§ 371 (c)(1),
(2) Date: May 10, 2024

(87) PCT Pub. No.: WO2023/088891
PCT Pub. Date: May 25, 2023

(65) Prior Publication Data
US 2025/0001909 A1 Jan. 2, 2025

(30) Foreign Application Priority Data
Nov. 17, 2021 (FR) ...................................... 2112143

(51) Int. Cl.
*B60N 2/07* (2006.01)
*F16C 29/02* (2006.01)
(52) U.S. Cl.
CPC ........... *B60N 2/072* (2013.01); *B60N 2/0732* (2013.01); *F16C 29/02* (2013.01)
(58) Field of Classification Search
CPC .. B60N 2/0705; B60N 2/0272; B60N 2/0715; B60R 21/01554
(Continued)

(56) References Cited

U.S. PATENT DOCUMENTS

2017/0261343 A1 9/2017 Lanter
2022/0396177 A1* 12/2022 Jablonski ............. B60N 2/0244

FOREIGN PATENT DOCUMENTS

DE 102004030282 A1 * 1/2006 ............. B60N 2/929
DE 102005011262 9/2006
DE 102005011262 A1 9/2006

OTHER PUBLICATIONS

Preliminary Search Report for priority French Patent App. No. FR2112143 dated Aug. 3, 2022, 8 pages, No English Translation available.

(Continued)

*Primary Examiner* — Sarah B McPartlin
(74) *Attorney, Agent, or Firm* — Barnes & Thornburg LLP

(57) ABSTRACT

The present invention relates to a motor vehicle seat slide (1) comprising an upper, movable male profile (2) and a lower female profile (3), comprising a base wall (30), and a position sensor (4) attached to the male profile (2) and housed at least partially in an internal space (EI) delimited between the male profile (2) and the female profile (3), which position sensor is configured to detect a movement between the male profile and the female profile when the slide slides, said position sensor (4) being configured to be inserted into the internal space (EI) through a mounting window (FE1) in the first side wall (23), and in a transverse insertion direction (Y) perpendicular to the longitudinal direction of the slide, said position sensor (4) comprises a sensor body (40), as well as a spring locking member (5) which is made of metal and hingedly connected to the sensor body (40).

17 Claims, 7 Drawing Sheets

(58) Field of Classification Search
USPC .......................................... 297/234.1, 234.18
See application file for complete search history.

(56)                    References Cited

OTHER PUBLICATIONS

International (PCT) Search Report for priority International (PCT) Patent App. No. PCT/EP2022/081977, dated Feb. 3, 2023, 4 pages.
International Search Report and Written Opinion for PCT/EP2022/081977 dated Feb. 23, 2023.
Preliminary Search Report for FR2112143 dated Aug. 3, 2022.

* cited by examiner

VEHICLE SEAT SLIDE

CROSS REFERENCE TO RELATED APPLICATIONS

This application is a U.S. national stage application under 35 U.S.C. § 371(b) of International Application No. PCT/EP2022/081977 filed Nov. 15, 2022, which claims priority to the France Patent Application No. 2112143 filed on Nov. 17, 2021, the disclosures of both of which are hereby expressly incorporated by reference in their entirety.

The present disclosure relates to a slide for a vehicle seat which comprises a male section and a female section, sliding with respect to one another, as well as a position sensor attached to the male section, configured to detect a movement of the male section with respect to the female section.

The present disclosure further relates to equipment comprising a slide according to the present disclosure and an unlocking tool configured to allow the extraction of the position sensor from the male section of the slide.

The present disclosure further relates to a method for mounting a slide according to the present disclosure.

TECHNICAL FIELD

The present disclosure relates to slides for vehicle seats comprising a female section and a male section mounted to slide with respect to one another, and a position sensor attached to the male section, in an internal space of the slide.

PRIOR ART

Known for example from document U.S. Pat. No. 6,053,529 A is a vehicle seat slide having a female section and a male section mounted to slide with respect to the female section along the longitudinal direction of the slide, the female section surrounding the male section in the transverse direction of the slide. This slide also has a position sensor configured to determine the position of the female section with respect to the male section, cooperating with a substantially L-shaped protrusion, provided on an outer side wall of the female section, projecting toward the outside of said female section. The position sensor, in this case a magnetic field sensor, is attached to a support, provided on an outer side wall of the male section, protruding toward the outside of said male section, and provided to internally receive said L-shaped protrusion so that the position sensor is located opposite said L-shaped protrusion. The magnetic field, or its variation, measured by the position sensor makes it possible to know the position of the female section with respect to the male section along the longitudinal direction of the slide, and therefore of the seat intended to be attached to the floor of a vehicle via said slide, and for example in order to be able to manage the deployment of a passenger restraint system, such as an airbag for example.

Such a slide has several drawbacks.

First, the design of the position sensor requiring cooperation with said L-shaped protrusion attached projecting to the outside on the female section increases the bulk of the slide, and in particular in its transverse direction.

Additionally, such a design of the position sensor, in particular with the need to cooperate with said L-shaped protrusion attached projecting to the outside on the female section of the slide, makes the design of the slide more complex and substantially increases its cost.

In addition, since the position sensor requires the use of elements projecting to the outside from the female section, it risks being damaged by other elements of the vehicle whereupon the slide is attached, such as the feet of an occupant of the vehicle for example, and may no longer be operable, which may represent a high safety risk for the occupants of a vehicle wherein a seat is attached to the floor via said slide.

Finally, such a slide is long and complex to manufacture, which also substantially increases its cost.

SUMMARY

The present disclosure improves the situation.

In a first aspect of the present disclosure, what is proposed is a motor vehicle seat slide comprising:

a movable upper male section intended to be attached to a frame of a seat squab, said male section comprising a main wall extending longitudinally in a sliding direction X and transversely in a transverse direction Y along a horizontal plane, as well as a first side wall, on a first side of the main wall, extending in line with the main wall along a first vertical plane, as well as a second side wall, on a second side of the main wall, extending along a second vertical plane, and wherein the first side wall is extended below by a first male part and wherein the second side wall is extended by a second male part, a lower female section, comprising a base wall, intended to be attached to the floor of a vehicle, said base wall extending longitudinally in the sliding direction X and transversely in the transverse direction Y, and wherein said base wall is extended, on a first side, by a first female part receiving the first male part, and forming with said first male part, at least one raceway between the first male part and the first female part, and on a second side, by a second female part, receiving the second male part, and forming with the second male part at least one raceway, a position sensor attached to the male section and housed at least partially in an internal space delimited between the male section and the female section, which position sensor is configured to detect a movement between the male section and the female section when the slide slides, said position sensor being configured to be inserted into the internal space through a mounting window in the first side wall, and in a transverse insertion direction perpendicular to the longitudinal direction of the slide, said position sensor comprises a sensor body, as well as a spring locking member which is made of metal and hingedly connected to the sensor body, and wherein said position sensor is configured to be:

inserted in the transverse direction through the mounting window into the first side wall, in a first relative position of the metal spring member with respect to the sensor body until the sensor body is abutting with an inner face of the second side wall, locked, by movement of the metal spring member from the first relative position to a second relative position of the spring locking member with respect to the body of the sensor, wherein said spring locking member is braced against an inner face of the first side wall so as to keep the body of the sensor pressed against the inner face of the second side wall by keeping the spring locking member elastically compressed between the first side wall and the second side wall.

The features disclosed in the following paragraphs may optionally be implemented. They can be implemented independently of one another or in combination with one another:

According to one embodiment, the body of the sensor extends in the transverse direction from a first end comprising an electrical connection interface for electrical cables, in particular protruding externally from the window of the first side wall to a second end of the sensor body incorporating a sensitive detection part, said second end of the sensor body abutting against the second side wall of the male section, said sensitive detection part arranged opposite a detection window in the second side wall of the male section, said sensitive detection part arranged to ensure the detection of a wall of the female section, in particular to ensure the detection of a wall of the second female part;

According to one embodiment, the body of the sensor comprising an upper face, a lower face, and two side faces consisting of a first side face and a second side face extending longitudinally to the body along the transverse direction and over the height of the body along the vertical direction, and said spring locking member comprises a median portion, extending along the longitudinal direction, in a pivoting connection with the sensor body, extended at its two ends respectively by two branches, extending respectively on both sides of the sensor body, consisting of a first branch, extending facing the first side face and a second branch extending facing the second side face, the first branch terminating at its distal end by a first bearing portion, and the second branch terminating by a second bearing portion, the first bearing portion and the second bearing portion respectively in contact against the inner face of the first side wall in said second relative position of the locking member with respect to the sensor body.

According to one embodiment, the median portion is received releasably in an attachment groove at the lower face of the sensor body, the groove and the median portion received in the groove forming a pivoting connection, with an axis oriented along the longitudinal direction of the slide, allowing the spring locking member to switch from the first relative position of the locking member with respect to the sensor body to the second relative position of the locking member with respect to the sensor body, and vice versa. The groove may be arranged proximate to the second end of the sensor body with respect to the first end, and in particular the groove is situated, in the transverse direction Y, at a distance from the first side wall, greater than half the distance between the first side wall and the second side wall in said transverse direction.

According to an advantageous embodiment, the first face and the second face of the body may respectively comprise:
a first notch and a second notch respectively engaging with the first branch and the second branch in the first relative position of the spring locking member with respect to the body of the sensor, which is a stable position
a third notch and a fourth notch respectively engaging with the first branch and the second branch in the second relative position of the spring locking member with respect to the body of the sensor, which is a stable position,
so that the passage of the spring locking member from the first, stable relative position to the second, stable relative position is allowed by the elastic deformation of the spring locking member, during which the first and second branches move away from one another to escape the notches before elastically returning into the notches in one or the other of the first and second stable relative positions with respect to the sensor body.

According to one embodiment, the mounting window has a lower edge, an upper edge, a first lateral edge and a second lateral edge; advantageously, the first lateral edge and the second lateral edge may comprise, respectively, from top to bottom:
two segments that are remote from one another, followed respectively by:
a first ramp and a second ramp converging downwardly, respectively followed downwardly by:
two segments that are close to one another.
The first ramp and the second ramp are then configured during the passage of the spring locking member from the first relative position to the second relative position to cooperate respectively with the first bearing portion of the first branch, on the one hand, and the second bearing portion of the second branch, on the other hand, by causing the two branches consisting of the first and the second branch to come closer together, the two close-together segments of the two lateral edges configured to then hold the spring locking member in the second relative position of the spring locking member with respect to the body of the sensor for which the first branch and the second branch are respectively engaged in the third notch and the fourth notch and kept in the notches by the two close-together segments respectively in contact with the first and second portions opposing the separation of the first and second branches.

Advantageously, the spring locking member can consist of a metal wire shaped as a single piece to form the median portion, which is extended by the metal wire, on one side of the median portion by the first branch followed by the first bearing portion and extended on the other side of the median portion by the second branch followed by the second bearing portion.

According to one embodiment, the first branch and the second branch extending parallel to one another in the transverse direction, respectively having a curved profile, for example arched, contained in two planes parallel to the longitudinal direction of the slide.

According to one embodiment, the first bearing portion and the second bearing portion respectively comprise two U-shaped segments of the metal wire extending along the same plane parallel to the longitudinal direction of the slide, the two U-shaped segments being configured to bear against the first side wall inner face, in the second relative position of the locking member with respect to the sensor body, and in particular along two offset positions in the longitudinal direction.

According to one embodiment, the sensor body may comprise a first shoulder and a second shoulder, protruding respectively from the first face wall and the second side face configured to abut against the inner face of the second side wall of the male section, on both sides of the detection window, along the longitudinal direction of the slide.

According to one embodiment, the sensor body comprises an upper face, as well as a portion, in particular flexible, on its lower face configured to bear on a lower edge of the mounting window so as to press the upper face of the sensor body against the underside of the main wall of the male section, when the position sensor is locked in the male section.

According to one embodiment, said slide is motorized by a screw/nut system whose screw is secured to the female section by support plates and housed in the internal space, the screw oriented in the longitudinal direction, the nut screwed onto the screw secured to a housing that is secured to the male section, and wherein the position sensor is arranged in the internal space above the screw and the support plate(s).

The slide can be asymmetrical, the first side wall extending heightwise along a dimension greater than the second side wall, the first male part and the first female part being entwined, positioned proximate to the base wall of the female section, while the second male part and the second female part are entangled, are positioned proximate to the main wall of the male section.

According to a second aspect, the present disclosure relates to a vehicle seat comprising a slide whose male section is attached to a seat squab and whose female section is attached to the floor of the vehicle, or vice versa.

According to a third aspect, the present disclosure further relates to equipment comprising a slide according to the present disclosure and an unlocking tool comprising a first rod and a second rod, parallel to one another, the position sensor attached to the male section, locked by the spring locking member then in said second relative position of the spring locking member with respect to the body of the sensor, and wherein the first side wall and the second side wall of the sensor body respectively comprise a first slot and a second slot, oriented in the transverse direction, respectively, in line with the first and second spring locking member branches then in the second position with respect to the sensor body and wherein the unlocking tool is configured to ensure the unlocking of the position sensor by simultaneous insertions of the first rod and the second rod of the unlocking tool respectively in the first slot and the second slot, which cause the first and second branches to separate and to escape from the third and fourth notches while allowing the passage of the spring locking member from the second position of the spring locking member with respect to the sensor body, preventing the removal of the position sensor to the first relative position of the spring locking member with respect to the sensor body allowing the extraction of the position sensor by the mounting window.

According to a fourth aspect, the present disclosure relates to a method for mounting a slide comprising the provision, in the disassembled state, of a slide comprising, on the one hand, a movable upper male section intended to be attached to a frame of a seat squab, said male section comprising a main wall extending longitudinally along a sliding direction X and transversely in a transverse direction Y along a horizontal plane, as well as a first side wall, on a first side of the main wall, extending in line with the main wall along a first vertical plane, as well as a second side wall, on a second side of the main wall, extending along a second vertical plane, and wherein the first side wall extends below by a first male part and wherein the second side wall extends by a second male part and, on the other hand, a lower female section comprising a base wall, intended to be attached to the floor of a vehicle, said base wall extending longitudinally in the sliding direction X and transversely along the transverse direction Y, and wherein said base wall extends, on a first side, by a first female part receiving the first male part, and forming, with said first male part, at least one raceway between the first male part and the first female part, and on a second side, by a second female part, receiving the second male part, and forming, with the second male part, at least one raceway, a position sensor intended to be attached to the male section comprises a sensor body, as well as a metal spring locking member, hingedly connected to the sensor body, and wherein the position sensor is assembled to the slide by the following steps:

inserting in the transverse direction through a mounting window into the first side wall of the male section, in a first relative position of the metal spring member with respect to the sensor body until the sensor body is abutting with an inner face of the second side wall, locking, by movement of the metal spring member from the first position to a second relative position of the spring locking member with respect to the body of the sensor, wherein said spring locking member becomes braced against an inner face of the first side wall so as to keep the body of the sensor pressed against the inner face of the second side wall by keeping the spring locking member elastically compressed between the first side wall and the second side wall.

BRIEF DESCRIPTION OF THE DRAWINGS

Other features, details and advantages will become apparent on reading the following detailed description and the analysis of the appended drawings, in which:

FIG. 5 shows, on the left, a sectional view of the slide of FIG. 4, according to the second relative position of the spring locking member with respect to the body of the sensor ensuring the locking of the sensor to the male section of the slide with the pressing of the body of the sensor against the inner face by the spring locking member braced between the first side wall and the second side wall of the male section, and on the right, the detail view of the slide seen in line with the mounting window of the sensor in this same position, notably with the first bearing portion and the second bearing portion in contact with the close-together segments of the lateral edges of the mounting window, the two contacts prohibiting a separation between the two branches of the spring locking member.

Figure 6:
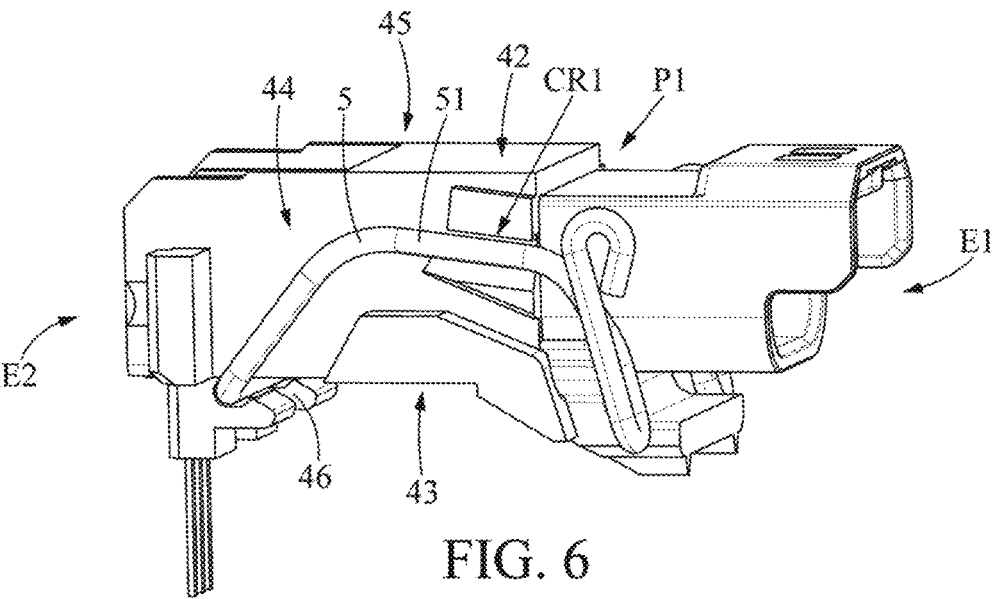

FIG. 6 is a detail view of the position sensor, in the first relative position of the spring locking member with respect to the sensor, the first and the second branches respectively being kept in a first notch of a first side face and in a second notch of a second side face of the sensor body.

Figure 7:
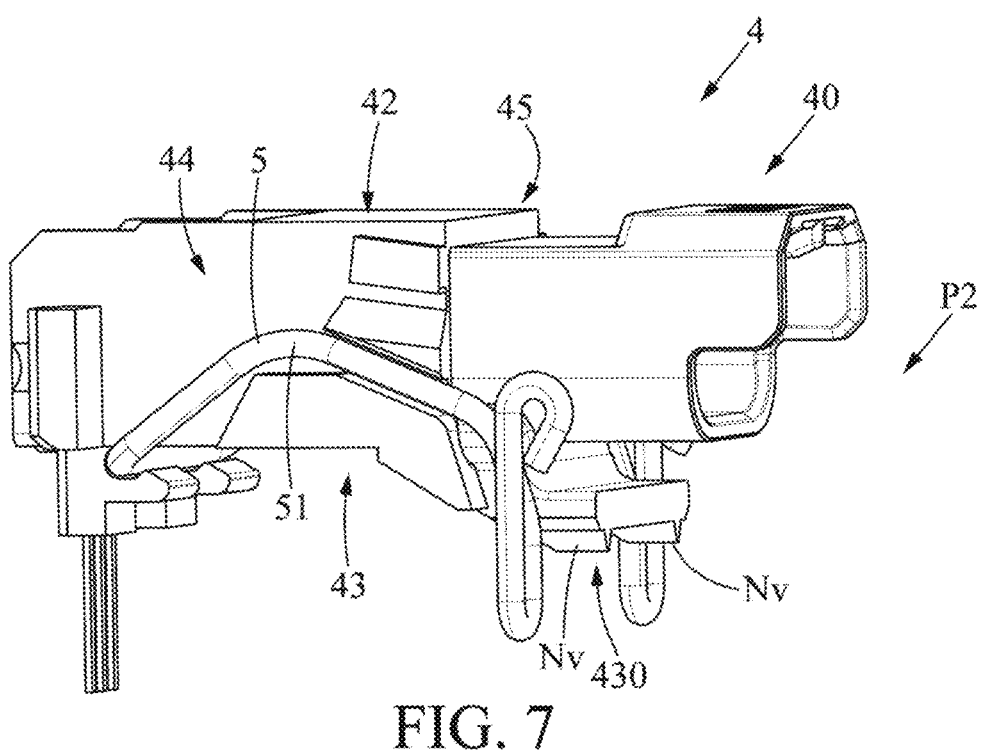

FIG. 7 is a detail view of the position sensor, in the second relative position of the spring locking member with respect to the sensor, the first and the second branches respectively being kept in a third notch of a first side face and in a fourth notch of a second side face of the sensor body.

Figure 8:
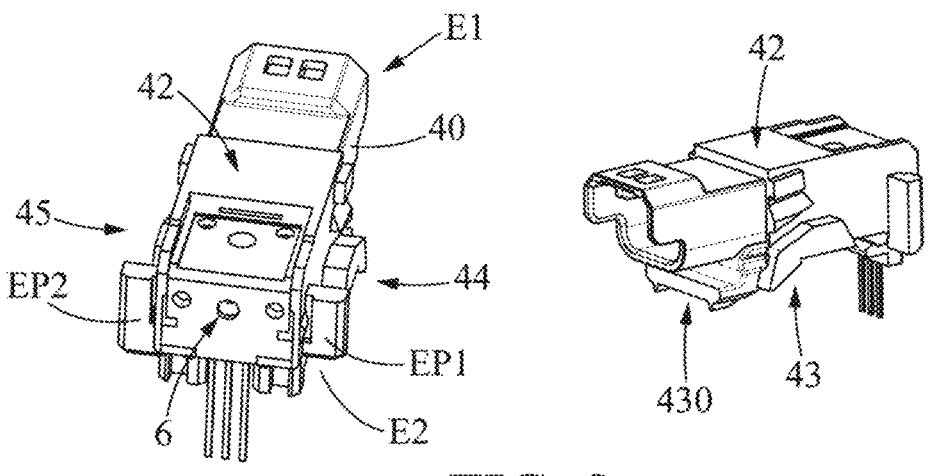

FIG. 8 shows two detail perspective views of the position sensor, showing the detection part (magnetic Hall effect) and various functional surfaces, and in particular two shoulders (first and second) projecting from the first and second side faces intended to bear against the inner face of the second side wall of the male section, on both sides of the detection window, as well as an upper face of the sensor body intended to come into contact with the underside of the main wall of the male section when a portion of the inner face comes to bear against the lower edge of the mounting window.

Figure 9:
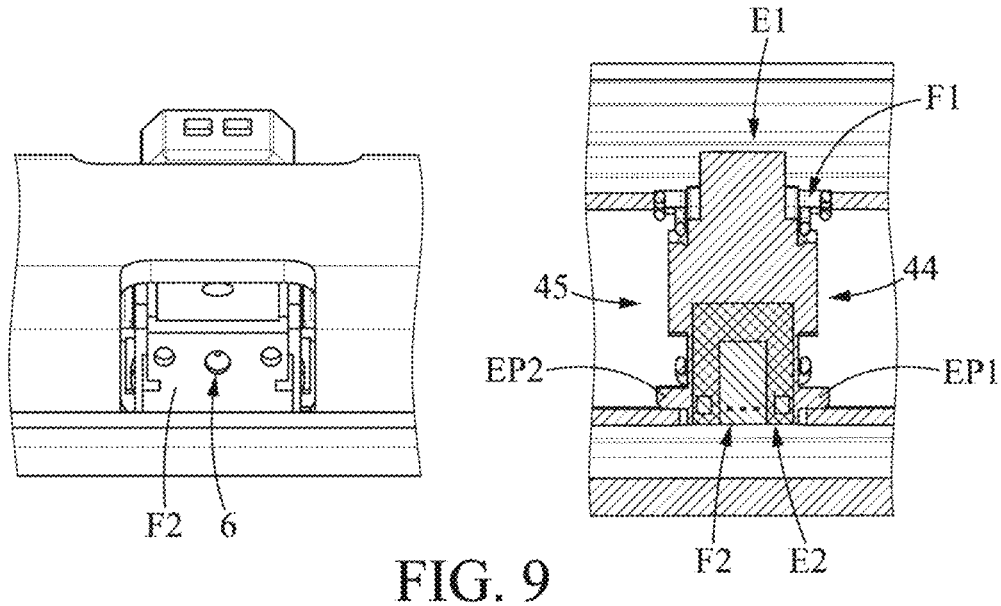

FIG. 9 is, on the left, a detail view of the slide seen from the detection window, positioned in line with the Hall effect detection part of the position sensor, and on the right, a sectional view along a horizontal plane, showing the two shoulders (first and second) projecting from the first and second side faces bearing against the inner face of the second side wall of the male section.

Figure 10:
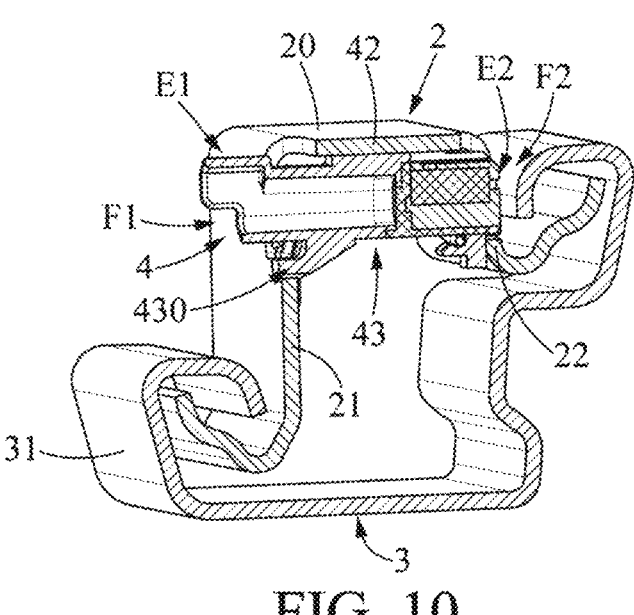

FIG. 10 shows a sectional view, showing the body of the sensor pressed by its upper face against the underside of the main wall of the male section, under the stress of the portion of the lower face bearing against the lower edge of the mounting window of the male section.

Figure 11:
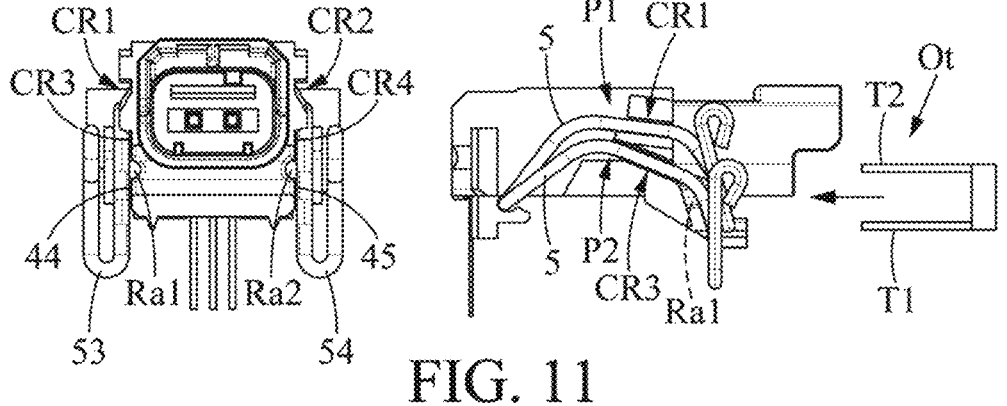

FIG. 11 is, on the left, a view of the position sensor in the second relative position of the spring locking member with respect to the body of the sensor, notably showing a first slot and a second slot in the side faces, allowing the insertion of rods of an unlocking tool; and on the right, the equipment that in particular comprises the position sensor and the unlocking tool.

Figure 12:
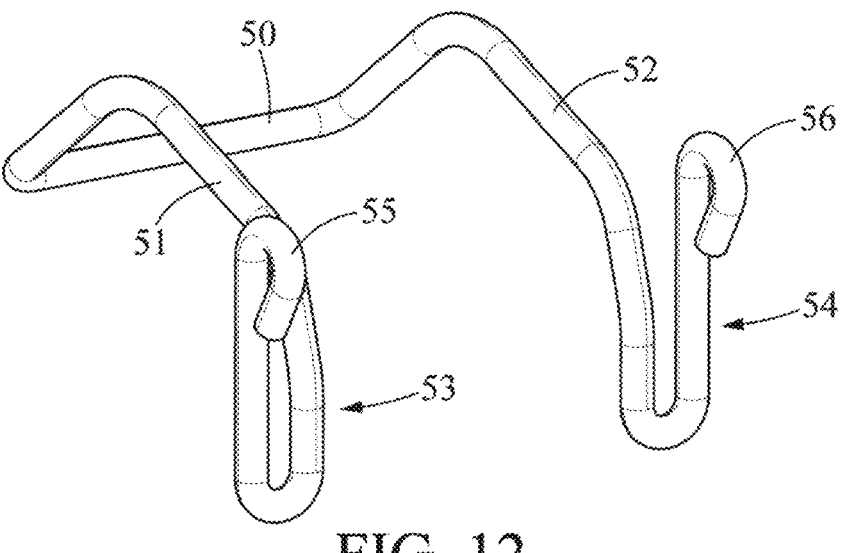

FIG. 12 is a view of the locking member consisting of a metal wire shaped as a single piece and forming the median portion, the first and second arched profile branches, as well as the first bearing portion and the second bearing portion of the spring locking member.

Figure 13:
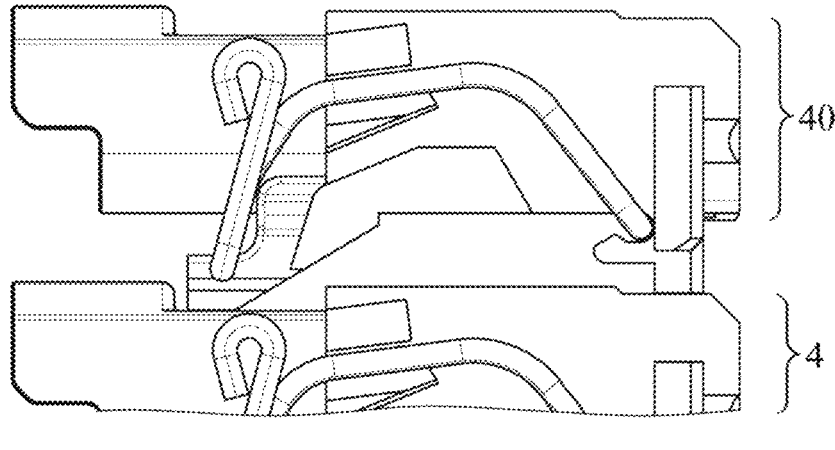

FIG. 13 is a view of two position sensor bodies superimposed on one another, when the locking members are in the first relative position with respect to the body of the sensor, allowing stable stacking of the bodies of the position sensors, horizontally.

DESCRIPTION OF THE EMBODIMENTS

The following drawings and description contain, for the most part, elements of certainty. They may therefore not only serve to enhance understanding of this disclosure, but also contribute to its definition, where appropriate.

Thus, the present disclosure relates to a slide 1 for a motor vehicle seat which comprises a male section 2, and a female section 3, slidably mounted with respect to one another in a sliding direction X.

More particularly, the slide comprises the movable upper male section 2 intended to be attached to a frame of a seat squab, said male section comprising a main wall 20 extending longitudinally in a sliding direction X and transversely in a transverse direction Y along a horizontal plane, as well as a first side wall 21, on a first side of the main wall, extending in line with the main wall 20 along a first vertical plane, as well as a second side wall 22, on a second side of the main wall, extending along a second vertical plane, and wherein the first side wall is extended below by a first male part 23 and wherein the second side wall is extended by a second male part 24, a lower, female section 3, comprising a base wall 30, intended to be attached to the floor of a vehicle, said base wall 30 extending longitudinally in the sliding direction X and transversely in the transverse direction Y, and wherein said base wall 30 is extended, on a first side, by a first female part 31 receiving the first male part 23, and forming with said first male part 23, at least one raceway CH1, CH2 between the first male part 23 and the first female part 31, and in particular a first raceway CH1 and a second raceway CH2, and on a second side, by a second female part 32, receiving the second male part 24, and forming with the second male part at least one raceway CH3, CH4, and in particular a third raceway CH3, and a fourth raceway CH4.

The present application is particularly applicable when the slide is asymmetrical; the first side wall 21 then extends heightwise along a dimension greater than the second side wall 22.

Figure 1:
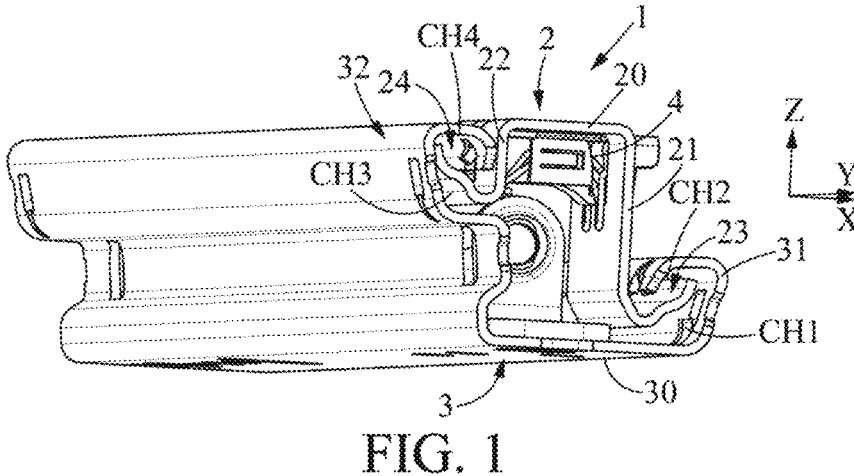
FIG. 1 is a perspective view of a slide according to one embodiment of the present disclosure.

The first male part 23 and the first female part 31 are then entangled, located proximate to the base wall 30 of the female section, while the second male part 24 and the second female part 32 are entangled, located proximate to the main wall 20 of the male section, seen in the vertical direction Z, and as shown for example in FIG. 1.

The slide 1 notably comprises a position sensor 4 attached to the male section 2 housed at least partially in an internal space Ei delimited between the male section 2 and the female section 3. The position sensor 4 is thus received at least partially in said internal space Ei, or even mostly in this volume. Arranging the position sensor in the inert volume is advantageous in order to optimize the compactness of the slide, and to limit the risks of deterioration of the sensor, and as compared to a slide arrangement with a position sensor external to the slide The position sensor 4 is configured to detect a movement between the male section 2 and the female section 2 during the sliding of the slide. To this end, it incorporates a sensitive detection part 6, which can be arranged opposite a detection window F2 in the second side wall 22 of the male section, said sensitive detection part 6 being arranged to ensure the detection of a wall of the female section 3, in particular to ensure the detection of a wall of the second female part 32. The sensitive detection part 6 may be magnetic (Hall effect sensor) makes it possible to detect a variation of the magnetic field during sliding, when the targeted wall comprises an indentation. By way of example, the position sensor may also be optical.

According to the present disclosure, said position sensor 4 is configured to be inserted into the internal space EI through a mounting window F1 in the first side wall 21, and along a transverse insertion direction Y perpendicular to the longitudinal direction of the slide.

Said position sensor 4 notably comprises a sensor body 40 that can be made of plastic, typically injection molded, forming a housing as well as a metal spring locking member 5, hingedly connected to the sensor body 40.

Such a position sensor 4 is configured to be:

inserted in the transverse direction Y through the mounting window F1 into the first side wall 21, in a first relative position P1 of the metal spring member 5 with respect to the sensor body 4 until the sensor body 40 is abutting with an inner face of the second side wall 22, locked, by movement of the metal spring member 4 from the first relative position P1 to a second relative position P2 of the spring locking member 5 with respect to the body of the sensor 40, wherein said spring locking member is braced against an inner face of the first side wall 2 so as to keep the body of the sensor 40 pressed against the inner face of the second side wall 22 by keeping the spring locking member 4 elastically compressed between the first side wall 21 and the second side wall 22.

Figure 3:
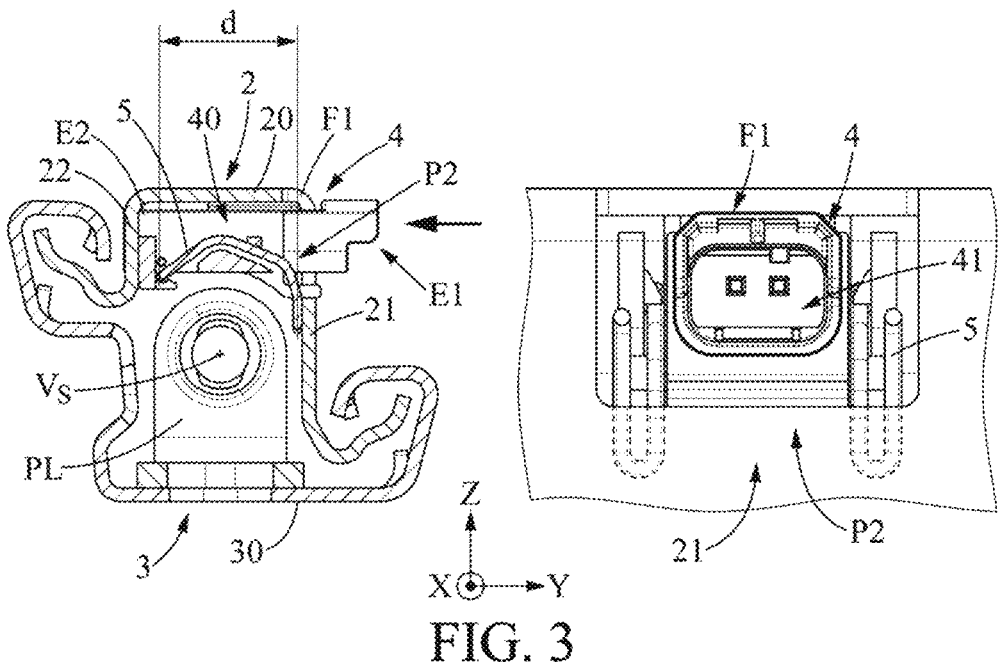
FIG. 3 shows, on the left, a sectional view of the slide of FIG. 1, according to the second relative position of the spring locking member with respect to the body of the sensor ensuring the locking of the sensor to the male section of the slide with the pressing of the body of the sensor against the inner face by the spring locking member braced between the first side wall and the second side wall of the male section, and on the right, the detail view of the slide seen in line with the mounting window of the sensor in this same position.

Thus, according to the present disclosure:

the first relative position P1 of the spring locking member with respect to the body of the sensor ensures easy mounting of the position sensor through the molding window, or even extraction thereof during disassembly; the bulk of the position sensor that comprises the sensor body and spring locking member in the first relative position allows an easy passage through the mounting window, the second relative position P2 of the spring locking member with respect to the body of the sensor ensures locking of the position sensor 4 to the male section 2 by advantageously pressing the position sensor against the second side wall 22 of the male section, on the detection side: The clearance between the body of the sensor 40 and the second side wall 22 is thus eliminated so as to keep the thickness of the air gap, identified La, which air gap is delimited between the sensitive detection part 6 and the wall of the female section targeted by the sensitive part 6, as constant as possible, seen in the transverse direction Y, and as shown in FIG. 3.

The spring locking member is made of metal, namely of a material that is stronger than the plastic of the body of the sensor 40, which makes it possible to firmly oppose the extraction of the sensor in the second relative position P2 with respect to the body of the sensor when the sensor is removed, limiting the risks of tearing out with respect to the use of a plastic material.

According to one embodiment, the body of the sensor 40 extends in the transverse direction Y from a first end E1 in particular comprising an electrical connection interface 41 for electrical cables, in particular protruding outward from the window F1 of the first side wall to a second end E2 of the sensor body incorporating a sensitive detection part 6, the second end E2 of the sensor body abutting the second side wall 22 of the male section. Said sensitive detection part 6 is arranged opposite the detection window F2 in the second side wall 22 of the male section, said sensitive detection part 6 being arranged to ensure the detection of a wall of the female section in particular to ensure the detection of a wall of the second female part 32.

To this end, the sensor body 40 may comprise a first shoulder EP1 and a second shoulder EP2 protruding respectively from the first face wall 44 and the second side face 4, configured to abut against the inner face of the second side wall 22 of the male section, on both sides of the detection window F2, along the longitudinal direction X of the slide, and as shown as an example in FIG. 9.

According to one embodiment of the slide 1, the body of the sensor 40 may comprise an upper face 42, a lower face 43, and two side faces consisting of a first side face 44 and a second side face 45 extending longitudinally to the body along the transverse direction Y and over the height of the body along the vertical direction Z.

The sensor body 40 can comprise the upper face 42, as well as a portion 430 on the lower face 43 configured to bear on a lower edge Bi of the mounting window F so as to press the upper face 4 of the body of the sensor against the underside of the main wall 2 of the male section when the position sensor 4 is locked in the male section.

The portion 430 is preferably a flexible portion on the lower face 43 of the body. The contact between the portion 430 and the lower edge Bi of the window can be carried out by two protruding ribs Nv, extending along the transverse direction Y, and arranged in parallel along the same height level.

Advantageously, said spring locking member 5 may comprise a median portion 50, extending along the longitudinal direction X, in pivoting connection with the sensor body 40. The median portion 50 is extended at its two ends respectively by two branches, extending respectively on both sides of the sensor body 40. The two branches consist of a first branch 51, extending facing the first side face 44, and a second branch 52, extending facing the second side face 45.

The first branch 51 terminates at its distal end by a first bearing portion 53 and the second branch 52 terminates by a second bearing portion 54, the first bearing portion 52 and the second bearing portion 54 respectively being in contact against the inner face of the first side wall 21 in said second relative position P2 of the locking member with respect to the sensor body 40.

According to one embodiment, the median portion 50 can be received in particular releasably in a groove 46 for example at the lower face of the sensor body 40. The opening of the groove 46 has a dimension smaller than the diameter of the median portion 50. The median portion 50 can forcibly inserted into the groove 46, which elastically deforms, before returning to its position while ensuring that the median portion is kept within the groove.

The groove 46 and the median portion 50 received in the groove form a pivoting connection, with an axis oriented along the longitudinal direction X of the slide, allowing the spring locking member 5 to switch from the first relative position P1 of the locking member with respect to the sensor body 40 to the second relative position P2 of the locking member with respect to the sensor body 40, and vice versa. The groove 46 can be arranged proximate to the second end E2 of the body of the sensor 40 with respect to the first end E1, proximate to the second side wall 21

As can be seen in the figures, and in particular in the left view of FIG. 3, the groove 46 is situated, in the transverse direction Y, at a distance identified d with respect to the first side wall 21, greater than half the distance between the first side wall 21 and the second side wall 22 in said transverse direction Y.

According to an advantageous embodiment, the first face 44 and the second face 45 of the sensor body 40 may respectively comprise:

a first notch CR1 and a second notch CR2 respectively engaging with the first branch 51 and the second branch 52 in the first relative position P1 of the spring locking member 5 with respect to the body of the sensor 40, which is a stable position a third notch CR3 and a fourth notch CR4 respectively engaging with the first branch 51 and the second branch 52 in the second relative position P2 of the spring locking member with respect to the body of the sensor, which is a stable position.

Thus, the passage of the spring locking member 5 from the first stable position P to the second stable position P2 is allowed by the elastic deformation of the spring locking member 5, during which the first and second branches 51, 52 move away from one another to escape the notches (CR1, CR2; CR3; CR4) before elastically returning into the notches in one or the other of the first and second stable relative positions P1, P2 with respect to the sensor body.

Figure 2:
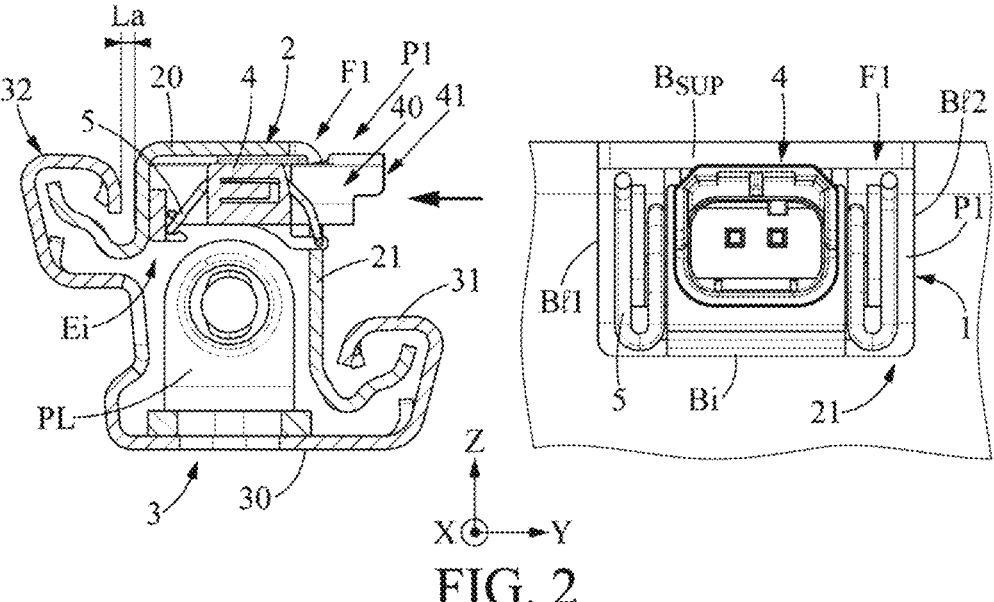
FIG. 2 shows, on the left, a sectional view of the slide of FIG. 1, according to the first relative position of the spring locking member with respect to the body of the sensor allowing the insertion or extraction of the sensor through the mounting window, and on the right, the detail view of the slide seen in line with the mounting window of the sensor in this same position.
Figure 4:
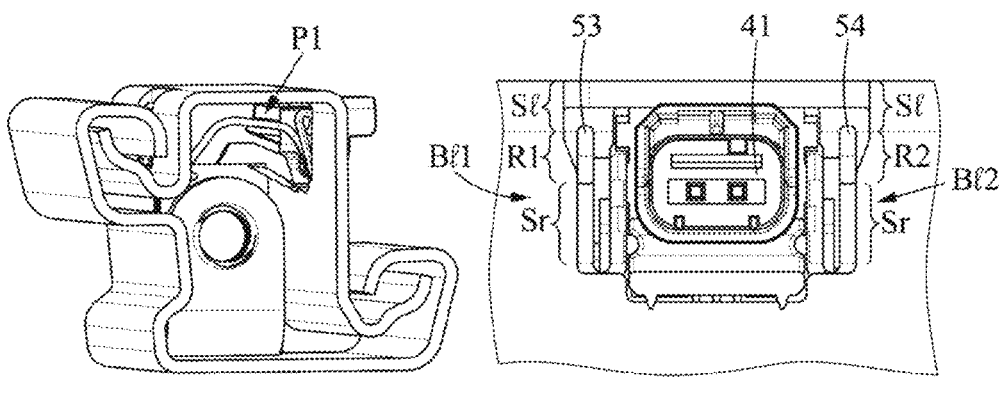
FIG. 4 shows, on the left, a sectional view of the slide according to a second embodiment that differs from the first embodiment by the shape of the mounting window, the left view showing the spring locking member, according to the first relative position of the spring locking member with respect to the body of the sensor, allowing the insertion or extraction of the sensor through the mounting window, and on the right, the detail view of the slide seen in line with the mounting window of the sensor in this same position.
Figure 5:
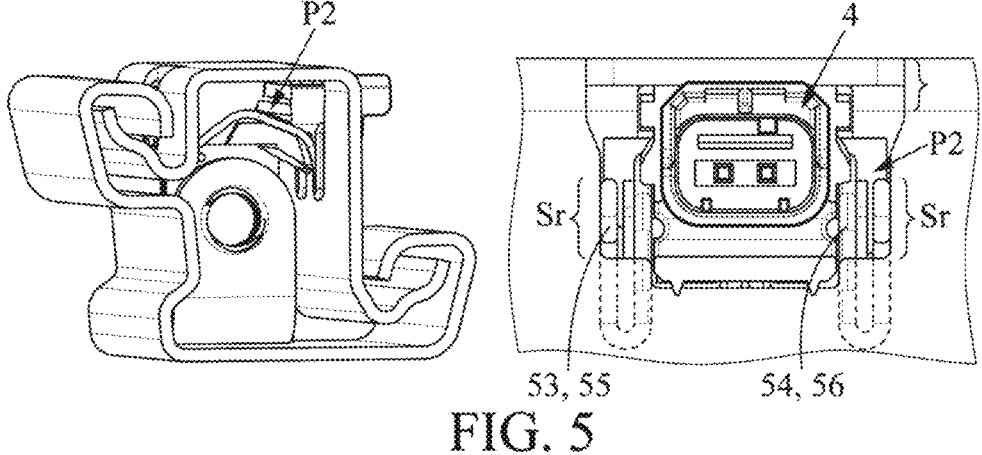

According to one embodiment, the mounting window F1 may have a lower edge Bi, an upper edge Bs, a first lateral edge BI1 and a second lateral edge BI2, and as shown according to the embodiment of FIG. 2 or according to the first embodiment of FIGS. 2 and 3, or according to the second embodiment of FIGS. 4 and 5.

The lateral edges BI1 and BI2 can be rectilinear parallel to one another, and as shown according to the first embodiment. However, and advantageously, according to the second embodiment shown in FIGS. 4 and 5, the first lateral edge BI1 and the second lateral edge BI2 may comprise, respectively, from top to bottom:

two segments Se that are remote from and parallel to one another, followed respectively by:

a first ramp R and a second ramp R converging downwardly, respectively followed downwardly by:

two segments Sr that are close and parallel to one another.

The first ramp R1 and the second ramp R2 are configured during the passage of the spring locking member 5 from the first position P1 to the second position P2 to cooperate respectively with the first bearing portion 53 of the first branch 51, on the one hand, and the second bearing portion 5 of the second branch, on the other hand, by causing the two branches 51, 52 consisting of the first and second branch to come closer together.

As shown in the view on the right in FIG. 5, the two close-together segments Sr of the two lateral edges BI1, BI2 are configured to hold the spring locking member 5 then in the second relative position P2 of the spring locking member with respect to the body of the sensor 40 for which the first branch 51 and the second branch 52 are engaged respectively in the third notch CR3 and the fourth notch CR4 and held in the notches CR3, CR4 by the two close-together segments Sr in contact respectively with the first and second bearing portions 53, 54, which oppose the separation of the first and second branches 51, 52. Such a profile of the lateral edges BI1 and BI2 imparts additional security to the notches CR3 and CR4, to prevent inadvertent unlocking.

According to one embodiment, the spring locking member 5 can consist of a metal wire shaped as a single piece to form the median portion 50, which is extended by the metal wire, on one side of the median portion 50 by the first branch 51 followed by the first bearing portion 53 and extended on the other side of the median portion by the second branch 52 followed by the second bearing portion 54, and as shown by way of non-limiting example in FIG. 12

The first branch 51 and the second branch 52 extend parallel to one another in the transverse direction, and may respectively have a curved profile, for example arched. The two curved paths, in particular arched, of the two branches 51, 51 are contained in two planes parallel to the longitudinal direction X of the slide.

The first bearing portion 53 and the second bearing portion 54 respectively comprise two U-shaped segments of the metal wire extending along the same plane parallel to the longitudinal direction X of the slide configured to bear against the first side wall 21 inner face, in the second relative position P2 of the locking member with respect to the sensor body 40. In particular, the two U-shaped segments forming the first bearing portion 53 and the second bearing portion 54 come into contact on the inner face of the first side wall 21, and in two positions offset in the longitudinal direction X, also called the sliding direction.

Each U-shaped segment terminates in an eyelet (first eyelet 55 for the first bearing portion 53 and second eyelet 56 for the second bearing portion 54) consisting of the wire, which is bent on itself; the plane of the eyelet (first eyelet 55 and second eyelet 56) is perpendicular to the longitudinal direction of the slide.

In the second relative position P2 of the spring locking member 5 with respect to the sensor body 40, the first eyelet 55 and the second eyelet 56 are constrained respectively by the close-together segments Sr of the first lateral edge BI1 and of the second lateral edge BI2.

According to one embodiment, the slide can be a slide with manual actuation.

According to one embodiment, the slide can be a slide motorized by a screw/nut system whose screw V is secured to the female section by support plates PL. The screw is housed in the internal space Ei, the screw being oriented in the longitudinal direction X, the nut being screwed onto the screw secured to a housing secured to the male section 2. According to the present disclosure, the position sensor 1 is arranged in the internal space EI above the screw and the support plate(s) PL.

According to the third aspect, the present disclosure relates to an equipment item comprising a slide whose sensor body comprises the notches CR1 to CR4 and an unlocking tool Ot, comprising a first rod T1 and a second rod T2, parallel to one another and held by the same support.

This unlocking tool Ot allows unlocking of the position sensor by taking said spring locking member from the second relative position P2 with respect to the sensor body to the first relative position P1 when, the position sensor attached to the male section, locked by the spring locking member 5, then in said second position P2 of the spring locking member 5 with respect to the body of the sensor 40.

According to this equipment, the first side wall 44 and the second side wall 45 of the sensor body 40 respectively comprise a first slot Ra1 and a second slot Ra2, oriented in the transverse direction Y, respectively in line with the first and second branches 51, 52 of the spring locking member then in the second relative position P2 with respect to the sensor body.

The unlocking tool Ot is then configured to ensure the unlocking of the position sensor 5 by simultaneous insertions of the first rod T1 and the second rod T2 of the unlocking tool respectively in the first slot R1 and the second slot R2, which cause the first and second branches 51, 52 to separate and to escape from the third and fourth notches CR3, CR4 while allowing the passage of the spring locking member 5 from the second relative position P2 of the spring locking member with respect to the sensor body, preventing the removal of the position sensor 4 to the first relative position P1 of the spring locking member with respect to the sensor body allowing the extraction of the position sensor by the mounting window F1.

According to the fourth aspect, the present disclosure relates to a method for mounting a slide according to the present disclosure comprising the provision, in the disassembled state, of a slide comprising, on the one hand, a movable upper male section 2 intended to be attached to a frame of a seat squab, said male section comprising a main wall 20 extending longitudinally along a sliding direction X and transversely in a transverse direction Y along a horizontal plane, as well as a first side wall 21, on a first side of the main wall, extending in line with the main wall 20 along a first vertical plane, as well as a second side wall 22, on a second side of the main wall, extending along a second vertical plane, and wherein the first side wall extends below by a first male part 23 and wherein the second side wall extends by a second male part 24 and, on the other hand, a lower female section 3 comprising a base wall 30, intended to be attached to the floor of a vehicle, said base wall 30 extending longitudinally in the sliding direction X and transversely along the transverse direction Y, and wherein said base wall 30 extends, on a first side, by a first female part 31 receiving the first male part 23, and forming, with said first male part 23, at least one raceway CH1, CH2 between the first male part 2 and the first female part 31, and on a second side, by a second female part 32, receiving the second male part 24, and forming, with the second male part, at least one raceway CH3, CH4, a position sensor 4 intended to be attached to the male section 2 comprising a sensor body 40, as well as a metal spring locking member 5, hingedly connected to the sensor body 40.

According to the method according to the present invention, the position sensor is assembled to the slide by the following steps inserting the position sensor 4 in the transverse direction Y through a mounting window F1 into the first side wall 21 of the male section 2, in a first relative position P1 of the metal spring member 5 with respect to the sensor body 4 until the sensor body 40 is abutting with an inner face of the second side wall 22, locking the position sensor 4, by movement of the metal spring member 4 from the first position P1 to a second relative position P2 of the spring locking member 5 with respect to the body of the sensor 40, wherein said spring locking member 5 becomes braced against an inner face of the first side wall 21 so as to keep the body of the sensor 4 pressed against the inner face of the second side wall 22 by keeping the spring locking member 4 elastically compressed between the first side wall 21 and the second side wall 22.

The movement of the spring member from the first relative position P1 to the second relative position P2 requires an external force that can be exerted manually by an operator, for example by pressing the eyelets 55, 56, or else mechanically automated.

INDUSTRIAL APPLICATION

The present technical solutions can be applied in particular to motor vehicle seats.

Thus, according to the second aspect, the present disclosure further relates to a vehicle seat comprising a slide whose male section is attached to a seat squab and whose female section is attached to the floor of the vehicle, or vice versa, namely that the male section is attached to the floor and the female section is attached to the squab.

LIST OF REFERENCE SIGNS

1. Slide,
2. Male section,
20. Main wall,
21, 22. First and second side walls,
23, 24. First and second male parts,

14

3. Female section,
30. Base wall,
31, 32. First and second female parts,
4. Position sensor,
40. Sensor body,
41. Connection interface,
42, 43. Upper face, lower face,
430 Portion of the lower face
44, 45. First side face and second side face,
46. Attachment groove
5. Spring locking member,
50. Median portion (forming a pivot with the groove 46),
51, 52. First and second branches,
53, 54. First bearing portion and second bearing portion
6. Sensitive detection part (for example, Hall effect),
La. Air gap (between the sensitive detection part 6 and the wall of the female section targeted by the sensitive part 6)
P1 First relative position of the metal spring member with respect to the sensor body,
P2. Second relative position of the metal spring member with respect to the sensor body,
Ei. Internal space (slide)
E1, E2. First and second ends (of the sensor body),
EP1, EP2. First and second shoulder (configured to bear against the second side wall on both sides of the detection window
CH1, CH2, CH3, CH4. Raceway (first, second, third, or fourth,
CR1, CR2, CR3, CR4. First, second, third and fourth notches
F1. Mounting window (in the first side wall),
Bs, Bi. Upper and lower edges (mounting window),
BI1, BI2. First lateral edge and second lateral edge,
Se. Remote segments (lateral edges),
R1, R2. First and second ramps (lateral edges),
Sr. Close-together segments (lateral edges),
F2. Detection window (in the second side wall),
Vs. Screw
PL. Support plate,
Ot. Unlocking tool,
T1 T2. First and second rods,
Ra1, Ra2. First and second slots,
X. Longitudinal direction,
Y. Transverse direction,
Z. Vertical direction,
The invention claimed is:

1. A slide for a motor vehicle seat, comprising:
a movable upper male section intended to be attached to a frame of a seat squab, said male section comprising a main wall extending longitudinally in a sliding direction X and transversely in a transverse direction Y along a horizontal plane, as well as a first side wall, on a first side of the main wall, extending in line with the main wall along a first vertical plane, as well as a second side wall, on a second side of the main wall, extending along a second vertical plane, and wherein the first male part extends from the first side wall, wherein the first male part extending from below the first side wall and wherein the second male part extends from the second side wall, wherein the second male part extending from below the second side wall
a lower, female section, comprising a base wall, intended to be attached to a floor of a vehicle, said base wall extending longitudinally in the sliding direction X and transversely in the transverse direction Y, and wherein said base wall is extended, on a first side, by a first female part receiving the first male part, and forming with said first male part, at least one raceway between the first male part and the first female part, and on a second side, by a second female part, receiving the second male part, and forming with the second male part at least one raceway, a position sensor attached to the male section and housed at least partially in an internal space delimited between the male section and the female section, which position sensor is configured to detect a movement between the male section and the female section when the slide slides, said position sensor being configured to be inserted into the internal space through a mounting window in the first side wall, and in a transverse insertion direction perpendicular to the longitudinal direction of the slide, said position sensor comprises a sensor body, as well as a spring locking member which is made of metal and hingedly connected to the sensor body, and wherein said position sensor is configured to be:

inserted in the transverse direction through the mounting window into the first side wall, in a first relative position of the metal spring member with respect to the sensor body until the sensor body is abutting with an inner face of the second side wall, locked, by movement of the metal spring member from a first relative position to a second relative position of the spring locking member with respect to the body of the sensor, wherein said spring locking member is braced against an inner face of the first side wall so as to keep the body of the sensor pressed against the inner face of the second side wall by keeping the spring locking member elastically compressed between the first side wall and the second side wall.

2. The slide of claim 1, wherein the body of the sensor extends in the transverse direction from a first end comprising an electrical connection interface for electrical cables, in particular protruding externally from the window of the first side wall to a second end of the sensor body incorporating a sensitive detection part, said second end of the sensor body abutting against the second side wall of the male section, said sensitive detection part arranged opposite a detection window in the second side wall of the male section, said sensitive detection part arranged to ensure the detection of a wall of the female section, in particular to ensure the detection of a wall of the second female part.

3. The slide of claim 1, wherein:

the body of the sensor comprising an upper face, a lower face, and two side faces consisting of a first side face and a second side face extending longitudinally to the body along the transverse direction and over a height of the body along the vertical direction, and said spring locking member comprises a median portion, extending along the longitudinal direction, in a pivoting connection with the sensor body, extended at its two ends respectively by two branches, extending respectively on both sides of the sensor body, consisting of a first branch, extending facing the first side face and a second branch extending facing the second side face, the first branch terminating at its distal end by a first bearing portion, and the second branch terminating by a second bearing portion, the first bearing portion and the second bearing portion respectively in contact against the inner face of the first side wall in said second relative position of the locking member with respect to the sensor body.

4. The slide of claim 3, wherein the median portion is received releasably in an attachment groove at the lower face of the sensor body, the groove and the median portion received in the groove forming a pivoting connection, with an axis oriented along the longitudinal direction of the slide, allowing the spring locking member to switch from the first relative position of the locking member with respect to the sensor body to the second relative position of the locking member with respect to the sensor body, and vice versa.

5. The slide of claim 4, wherein the groove is arranged proximate to the second end of the sensor body with respect to the first end, and in particular the groove is situated, in the transverse direction Y, at a distance from the first side wall, greater than half the distance between the first side wall and the second side wall in said transverse direction Y.

6. The slide of claim 3, wherein the first face and the second face of the body respectively comprise:

a first notch and a second notch respectively engaging with the first branch and the second branch in the first relative position of the spring locking member with respect to the body of the sensor, which is a stable position a third notch and a fourth notch respectively engaging with the first branch and the second branch in the second relative position of the spring locking member with respect to the body of the sensor, which is a stable position, so that the passage of the spring locking member from the first stable position to the second stable position is allowed by the elastic deformation of the spring locking member, during which the first and second branches move away from one another to escape the notches before elastically returning into the notches in one or the other of the first and second stable relative positions with respect to the sensor body.

7. The slide of claim 6, wherein the mounting window has a lower edge, an upper edge, a first lateral edge and a second lateral edge; and wherein the first lateral edge and the second lateral edge comprise, respectively, from top to bottom:

two segments that are remote from one another, followed respectively by:

a first ramp and a second ramp converging downwardly, respectively followed downwardly by:

two segments that are close to one another and wherein the first ramp and the second ramp are then configured during the passage of the spring locking member from the first relative position to the second relative position to cooperate respectively with the first bearing portion of the first branch, on the one hand, and the second bearing portion of the second branch, on the other hand, by causing the two branches consisting of the first and the second branch to come closer together, the two close-together segments of the two lateral edges configured to then hold the spring locking member in the second relative position of the spring locking member with respect to the body of the sensor for which the first branch and the second branch are respectively engaged in the third notch and the fourth notch and kept in the notches by the two close-together segments respectively in contact with the first and second bearing portions opposing the separation of the first and second branches.

8. The slide of claim 3, wherein the spring locking member consists of a metal wire shaped as a single piece to form the median portion, which is extended by the metal wire, on one side of the median portion by the first branch followed by the first bearing portion and extended on the other side of the median portion by the second branch followed by the second bearing portion.

9. The slide of claim 8, wherein the first branch and the second branch extending parallel to one another in the transverse direction, respectively having a curved profile, contained in two planes parallel to the longitudinal direction of the slide.

10. The slide of claim 8, wherein the first bearing portion and the second bearing portion respectively comprise two U-shaped segments of the metal wire extending along the same plane parallel to the longitudinal direction of the slide, the two U-shaped segments configured to bear against the first side wall inner face, in the second relative position of the locking member with respect to the sensor body.

11. The slide of claim 2, wherein the sensor body comprises a first shoulder and a second shoulder projecting respectively from the first face wall and the second side face configured to abut against the second side wall of the male section, on both sides of the detection window along the longitudinal direction of the slide.

12. The slide of claim 1, wherein the sensor body comprises an upper face, as well as a portion on its lower face configured to bear on a lower edge of the mounting window so as to press the upper face of the body of the sensor against an underside of the main wall of the male section when the position sensor is locked in the male section.

13. The slide of claim 1, motorized by a screw/nut system whose screw is secured to the female section by support plates and housed in the internal space, the screw oriented in the longitudinal direction, the nut screwed onto the screw secured to a housing that is secured to the male section, and wherein the position sensor is arranged in the internal space above the screw and the support plate(s).

14. The slide of claim 1, wherein movable upper male section and female section are asymmetrical, the first side wall extending heightwise along a dimension greater than the second side wall, the first male part and the first female part being entangled, positioned proximate to the base wall of the female section, while the second male part and the second female part are entangled, are positioned proximate to the main wall of the male section.

15. The slide of claim 1, the male section of which is attached to a squab of the seat and the female section of which is attached to the floor of the vehicle, or vice versa.

16. An equipment item comprising the slide according to claim 6 and an unlocking tool comprising a first rod and a second rod, parallel to one another, the position sensor attached to the male section, locked by the spring locking member then in said second position of the spring locking member with respect to the body of the sensor, and wherein the first side wall and the second side wall of the sensor body respectively comprise a first slot and a second slot, oriented in the transverse direction, respectively, in line with the first and second spring locking member branches then in the second position with respect to the sensor body and wherein the unlocking tool is configured to ensure the unlocking of the position sensor by simultaneous insertions of the first rod and the second rod of the unlocking tool respectively in the first slot and the second slot, which cause the first and second branches to separate and to escape from the third and fourth notches while allowing the passage of the spring locking member from the second position of the spring locking member with respect to the sensor body to the first relative position of the spring locking member with respect to the sensor body allowing an extraction of the position sensor by the mounting window.

17. A method for mounting the slide according to claim 1 comprising the provision, in the disassembled state, of a slide comprising, on the one hand, a movable upper male section intended to be attached to a frame of a seat squab, said male section comprising a main wall extending longitudinally along a sliding direction X and transversely in a transverse direction Y along a horizontal plane, as well as a first side wall, on a first side of the main wall, extending in line with the main wall along a first vertical plane, as well as a second side wall, on a second side of the main wall, extending along a second vertical plane, and wherein the first male part extends from the first side wall, wherein the first male part extending from below the first side wall and wherein the second male part extends from the second side wall, wherein the second male part extending from below the second side wall and, on the other hand, a lower female section comprising a base wall, intended to be attached to a floor of a vehicle, said base wall extending longitudinally in the sliding direction X and transversely along the transverse direction Y, and wherein said base wall extends, on a first side, by a first female part receiving the first male part, and forming, with said first male part, at least one raceway between the first male part and the first female part, and on a second side, by a second female part, receiving the second male part, and forming, with the second male part, at least one raceway, a position sensor intended to be attached to the male section comprises a sensor body, as well as a metal spring locking member, hingedly connected to the sensor body, and wherein the position sensor is assembled to the slide by the following steps inserting the position sensor in the transverse direction through a mounting window into the first side wall of the male section, in a first relative position of the metal spring member with respect to the sensor body until the sensor body is abutting with an inner face of the second side wall, locking the position sensor, by movement of the metal spring member from the first position to a second relative position of the spring locking member with respect to the body of the sensor, wherein said spring locking member becomes braced against an inner face of the first side wall so as to keep the body of the sensor pressed against the inner face of the second side wall by keeping the spring locking member elastically compressed between the first side wall and the second side wall.

* * * * *